Aug. 2, 1927.
J. L. COYLE
1,637,686
PROCESSING MACHINE
Filed Aug. 7, 1925
3 Sheets-Sheet 3
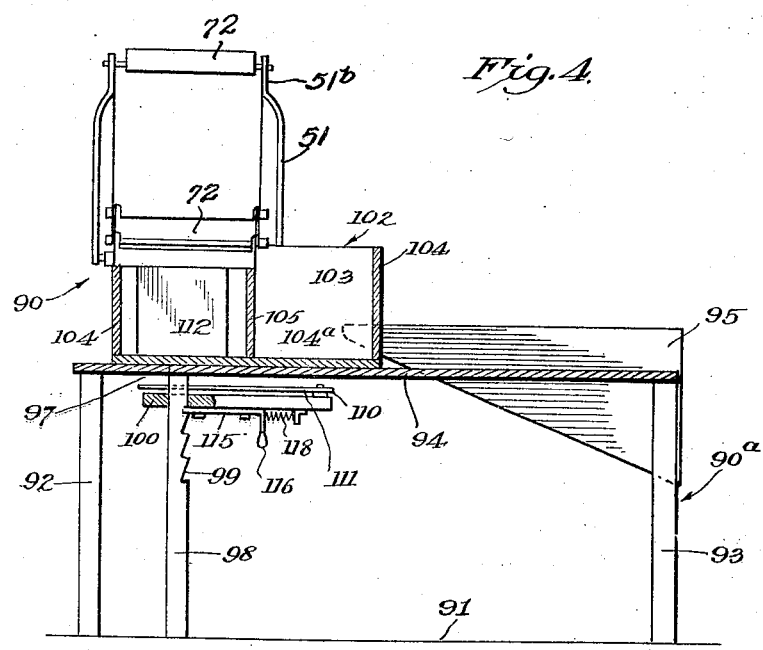
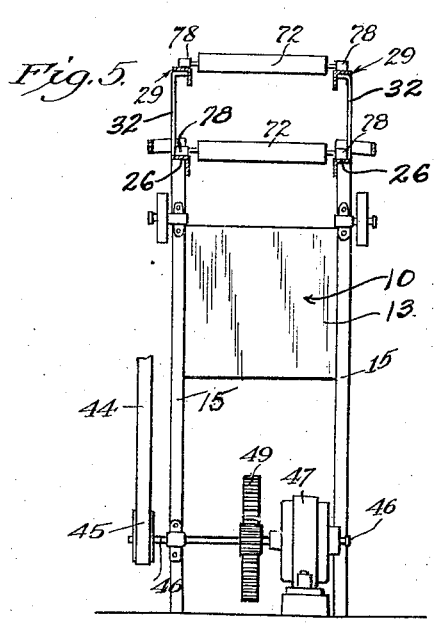
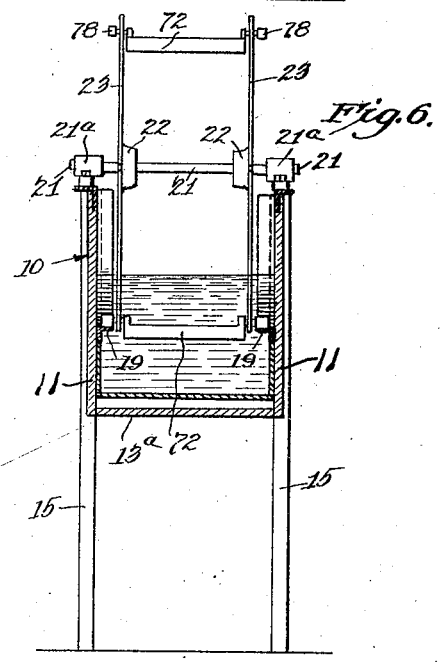
Inventor.
Joseph L. Coyle
by Hazard and Miller
Attorneys Patented Aug. 2, 1927.

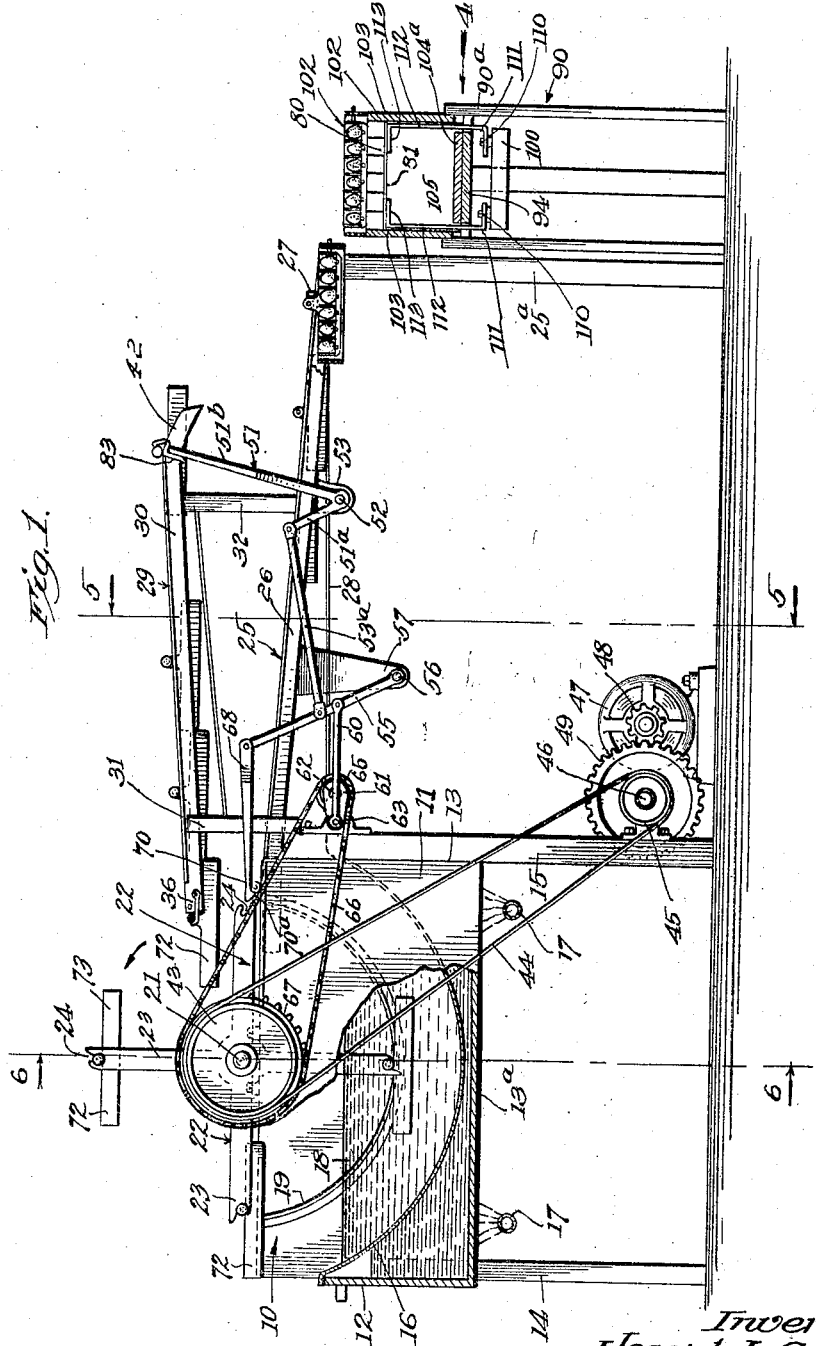

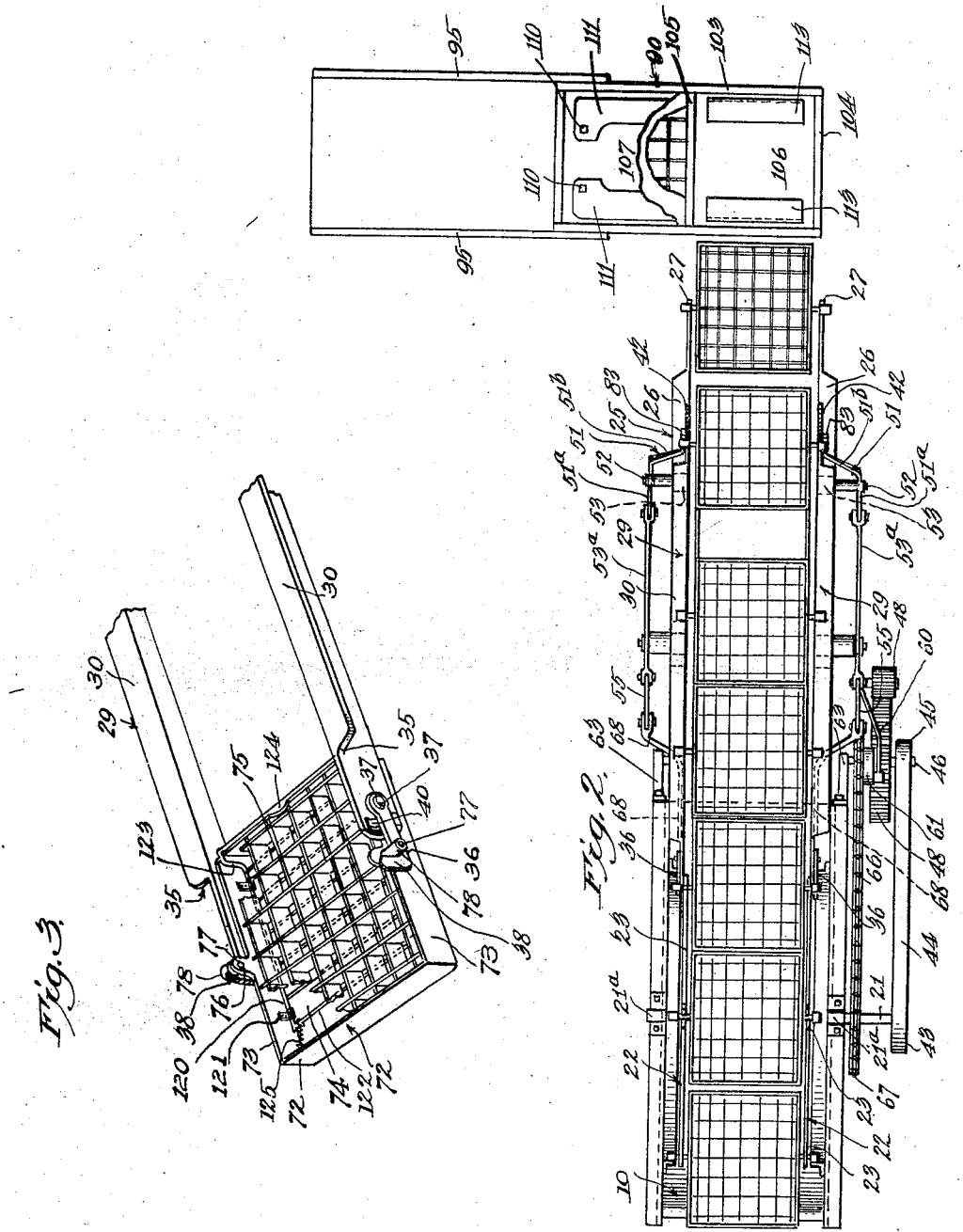

1,637,686

UNITED STATES PATENT OFFICE.

JOSEPH L. COYLE, OF LOS ANGELES, CALIFORNIA.

PROCESSING MACHINE.

Application filed August 7, 1925. Serial No. 48,728.

This invention relates to processing machines, and is particularly adapted to process eggs by passing them in trays or containers through a preserving liquid.

An object of this invention is the provision of a processing machine adapted to load a conveyor with trays filled with eggs, take the trays automatically from the conveyor, pass them through a tank containing preserving material and automatically deliver them after treatment or processing to a second conveyor and deliver them to a convenient point or position.

Another object of this invention is the combination with a processing machine of a receptacle adapted to conveniently receive processed material.

With the foregoing objects in view, together with such other objects and advantages as may subsequently appear, this invention consists in the construction and arrangement of parts hereinafter described and claimed and illustrated in the accompanying drawings, in which:

Figure 1 is a side elevation, partly broken away and partly in section, of the machine of my invention, Fig. 2 is a plan view of Fig. 1, Fig. 3 is a fragmentary perspective view of a conveyor employed in my machine, and showing an empty egg tray thereon, Fig. 4 is an end view taken in the direction of the arrow 4 of Fig. 1, Fig. 5 is a vertical section taken on the line 5—5 of Fig. 1, and Fig. 6 is a vertical section taken on the line 6—6 of Fig. 1.

Referring to the drawings for a more detailed description thereof, the numeral 10 indicates a tank, open at the top and having sides 11, a back end 12, a front end 13 and a bottom 13ᵃ. The tank is supported at the back corners by standards 14 and at the front corners by standards 15. The tank 10 has another bottom 16 arcuate the length thereof. Water is placed in the tank between the bottoms 13ᵃ and 16. A gas burner 17 is provided under the bottom 13ᵃ of the tank to heat the water which in turn heats the preserving liquid 18 which the tank holds. The inner faces of the sides 11 of the tank are provided with inwardly extending flanges 19 arcuate the length of the tank and concentric with the bottom of the tank. A shaft 21 is mounted in journals 21ᵃ on the upper edges of the sides 11 transversely the tank and carries, fixedly mounted thereon, two spaced vertical spiders 22 as clearly shown in Fig. 6. Each of the spiders 22 comprises four radial arms 23 spaced 90 degrees apart. The arms 23 of the spiders 22, when moving within the tank 10, are just inside the free edges of the flanges 19 and the free ends of the arms extend beyond the flanges. The free ends of the arms 23 are provided with notches 24, cut at an angle to the axis of the arms.

A conveyor 25, downwardly inclined away from the tank 10, is supported at one end on the front end 13 of the tank and at its other end on standards 25ᵃ. The conveyor 25 comprises two parallel spaced guide rails 26 which extend into the tank to the upper front edges of the arcuate flanges 19. The outer ends of the guide rails 26 are turned upwardly at 27, as shown in Fig. 1, for the purpose of providing stops for trays or containers carried on the conveyor. The guide rails 26 are spaced apart a distance equal to the distance between the inner faces of the arms 23 of the spiders 22, and are cut away at the outer edges of their inner ends to allow movement of the ends of the arms 23.

A drainboard 28 is provided under the conveyor 25 and is oppositely inclined to the conveyor and leads into the tank 10.

A conveyor 29, comprising two parallel spaced guide rails 30 is supported on members 31 and members 32, the former of which are secured to the front end 13 of the tank 10 and the latter of which are secured to the guide rails 26 of the conveyor 25. The conveyor 29 is inclined towards the tank 10, and the distance between the guide rails 30 is the same as the distance between the guide rails 26 of the conveyor 25. The upper portions of the guide rails 30 are cut away, as shown at 35 in Fig. 3, to allow movement of the ends of the arms 23. The inner ends of the guide rails 30 are provided with extensions 36 which are pivotally mounted at 37, and are turned upwardly at their free ends, forming projections 38 which are spaced from the ends of the rails 30. Spring latches 40 are provided to hold the extensions 36 in normal position, as shown in Fig. 3, when it is desired to maintain them in that position. The outer ends of the guide rails 30 are inclined opposite to the inclination of the greater part of the guide rails 30, as shown at 42 in Fig. 1.

In order to rotate the spiders 22, a pulley 43 is mounted on an end of the shaft 21 and is driven by a belt 44 mounted on a pulley 45 which is mounted on a shaft 46 driven by a motor 47 through gear wheels 48 and 49.

The machine comprises mechanism for lifting trays or containers from the conveyor 25 to the conveyor 29 and for moving the trays along the conveyor 25 after being discharged from the tank 10, and such mechanism is shown as comprising bell crank levers 51 situated on the opposite sides of the conveyors 25 and 29 and mounted on a rod 52 which is carried by lugs 53 secured to the guide rails 26. Links 53$^a$ are pivotally mounted at ends to the short arms 51$^a$ of the bell crank levers 51 and at their other ends to levers 55, which are pivotally mounted at their lower ends on pins 56 mounted in depending projections 57 secured to the guide rails 26. Levers 60 are pivotally mounted on the levers 55 and on cranks 61 which are mounted on a shaft 62 which is carried in bearings 63 secured to the front end 13 of the tank 10. The shaft 62 is rotated by a sprocket wheel 65 driven by a chain 66 which is driven by a sprocket wheel 67 on the shaft 21. With four arms on the spider wheels 22, the sprocket wheel 65 is adapted to move four times as fast as the sprocket wheel 67 so that the levers 68 and 51 are in position to engage four trays for every revolution of the spider wheels. Levers 55 have pivotally mounted thereon, levers 68 which lie above the guide rails of the conveyor 25 and extend nearly to the end of the guide rails 26 and have hooked ends 70 provided with inclined lower faces 70$^a$ adapted to slide over a roller and engage it in the loop of the hook. Attached to the upper ends of the longer arms 51$^b$ of the bell crank levers 51 are extensions 83 which are turned inwardly to lie over the guide rails 30. The extensions 83 are flexible springs of hook shape.

The machine is adapted to transport trays 72, shown in Fig. 3, having sides 73 containing a slidable grid 74 on which is supported an egg basket 75, the construction and operation of which will be hereafter described. The sides 73 are provided with lugs 76 which carry outwardly extending pins 77 which carry rollers 78 spaced in the lugs 76. The outer width of the tray 72 is slightly less than the inside distance between the guide rails of the conveyors 26 and 29. In operation of the machine, a tray 72 with the egg basket thereon is filled with eggs while stationary on the upper conveyor 29.

With the motor 27 running the bell crank levers 51 are rotated and thrown towards the front end of the machine downwardly until the flexible spring 83 engages the rollers 78. The tray is then carried forward on the hooks 83 with the upward and backward movement of the bell crank lever and is thrown off the hooks on to the conveyor 29. The trays traveling down this conveyor are held stationary while being loaded and then rolled over the conveyor to its lower end above the tank 10 and come to rest on the extensions 36, the rollers 78 of the trays running on the rails 30. A pair of arms 23 of the rotating spider wheels 22, moving in a counter-clockwise direction, engage the pins 77, fall into the notches 24 and the ends of the arms 23. The tray 72 with its contents is thereby lifted from the conveyor 29 and is carried around through the liquid 18 in the tank 10. While the tray 72 is moving through the tank 10, the pins 77 are held in engagement with the arms 23 due to the fact that the roller 78 rides on the flanges 19. When the tray reaches the front end of the tank it is thrown from the arms 23 on to the conveyor 25, the rollers 78 riding on the guide rails 26. As the tray 72 is thrown on to the conveyor 25, the levers 68 are in such position that the hooks 70 on the ends thereof engage the rear side of the rollers 78 of the tray and pull the tray forward for a short distance whereby the tray is insured a rolling motion on the conveyor 25. After pulling the tray 72 for a short distance, the levers 68 move up and out of engagement with the rollers 78 and the tray rolls by gravity down the conveyor 25 to the end thereof being limited by the stop 27. The tray 72 after being thus stopped is manually lifted over one side of the egg case and the eggs deposited therein as hereafter described.

It will be understood that the lever mechanism is timed so as to deliver a tray to the lower end of the conveyor 29 in readiness for each pair of arms 23 of the spiders.

It will also be understood that the lever mechanism is reciprocating in motion, so that the bell crank levers 51, after delivering a tray to the conveyor 29, return to pick up another tray from the conveyor 25.

The mechanism for receiving the holders containing treated eggs will now be described, being indicated by the numeral 90, and comprising a table 90$^a$ having a bottom 91, and upright ends 92 and 93 respectively with a top 94. Guides 95 are provided on either side of the top 94 and extend along substantially half the length of the top and on that half of the table which extends to one side of the processing machine. The top 94 of the table is diminished in width over part of its length, as indicated at 97, under which diminished portion a column 98, provided with notches 99, extends from the top 94 of the table to the bottom 91. The column 98 passes through a slot in a plate 100 which is adapted to move up and down the column.

An egg case 102 rests on the top of the table and is slidable thereon. The case 102 comprises sides 103, ends 104, a bottom 104ª and a partition 105, the latter dividing the case into two compartments 106 and 107 respectively. The lower ends of the sides 103 do not extend to the bottom 104ª of the box and the bottom 104ª is slightly narrower than the ends of the box, being substantially equal to the width of the top 94 at the reduced portion of the latter.

Hingedly secured to the upper face of the plate 100, as indicated at 110, are two opposing plates 111 which are turned upwardly at their end portions providing vertical portions 112 which are provided at their upper ends with inwardly turned flanges 113 shown as positioned within the compartment 106 of the egg case 90, the vertical portions 112 of the plates 111 passing inside the sides 103 of the case, as clearly shown in Fig. 1, this being allowed for by the fact that the sides 103 of the box do not extend to the bottom 104ª and the fact that the latter is narrower than the ends 104. Secured to the under face of the plate 100 is a latch 115 having a handle 116, the latch being held in engagement with one of the notches 99 by a coiled compression spring 118. It will thus be seen that the plate 100 may be secured at different heights on the column 98 in steps, provided for by the notches 99, which are separated by a distance equal to the height of the usual egg holder 80 with its loose bottom 81.

The construction of the egg basket in detail is as follows, having reference particularly to Fig. 3:

As stated above each tray 72 has a slidable grid 74 which is formed by side wires 120 slidable through brackets 121 attached to the opposite sides of the trays on the inside thereof and having cross wires 122 connected between the side wires. The side wires are bent upwardly at their ends indicated by the numeral 123 and have a handle bar 124 connecting the opposite side wires and forming a handle for moving them. The grid is retained in its rearward position by means of the tension springs 125. The egg basket 75, formed of metal strips rests on top of the grid and has a snug fit inside the tray 72.

As above mentioned, when the tray of eggs, after being processed, runs against the stop 27, it remains in this position until an operator lifts the tray over one of the compartments 106 or 107 of the egg case so that the edges of the tray will rest on the upper part of the egg case. The handle bar 124 is then pulled by the operator, which moves the grid 74 until the cross wires 122 are in alinement with the partitions of the egg basket so that the eggs may freely drop into the egg holder 80. The empty holder is then replaced at the lower end of the conveyer 25 against the stops 27 and is then in position to be elevated to the upper conveyer 29 as above described.

Figure 1 for purposes of illustration, shows a tray positioned against the stop 27 and another tray shown over the egg case, but in practice when the operator places the tray over the egg case, the position at the end of the conveyor will be left vacant until he replaces the empty tray.

The stand for the egg cases is shown in Fig. 1 at one side of the end of the conveyor rod to illustrate both methods of procedure. If, due to conditions in the filling and emptying of the trays it is impossible to keep up with the mechanical motion of the machine, the bell crank levers 51 may be disconnected so that the operator will place the egg trays on the upper conveyor 29, manually however, after the clamp is so arranged as to work entirely mechanically, it is desirable to position the egg case support directly at the end of the conveyor 25 underneath the position of the tray when retained by the stop 27.

While the egg holders 80 are being filled, the plate 100 will be raised to a position so that the flanges 113 are below the top of the case, and by distance equal to the depth of the egg holder 80 and bottom 81, this being shown in Fig. 1. After filling the topmost egg holder, the plate 100 is stepped down one notch so that a second egg holder with its loose bottom can be placed on the preceding egg holder. The plate 100 may thus be lowered in steps until the compartment 106 is filled, at which time the flanges 113 will rest on the bottom 104ª of the egg case. The plates 111 may then be swung outwardly, allowing the egg case to be removed from the table, the compartment 107 having been filled. When an empty case is placed on the table, the plates 111 may then be swung inwardly so that the vertical portions 112 and the flanges 113 are inside that compartment of the egg case which is to be filled first. The plate 100 may then be raised again to the position shown in Fig. 1.

The above description applies to a machine for dipping eggs in a solution. The principal purpose for which I utilize the machine is for treating eggs with a hot oil which is absorbed into the pores of the shell and thereby forms a substantially air tight covering for the egg. This oil is heated to quite a high temperature and the eggs must be passed through the body of oil at such a speed that the albumen will not become cooked or set as it greatly depreciates the commercial value of the eggs.

I have developed a method of handling eggs which may be called a processing by dipping. The steps consist of maintaining the whole body of oil at substantially the proper temperature governed by the quantity of oil and speed of operation for its best absorption into the shell and continuously passing batches of eggs through the oil, taking them from a stationary track and placing them on another stationary track whereby the eggs may be loaded into stationary trays or baskets and discharged from the trays or baskets while stationary. The speed of the machine in passing the eggs through the oil is maintained substantially constant, and to vary the time for maintaining the eggs in the oil, which is different for different temperatures of the oil, means by which the raising and lowering of the level of the oil may be accurately gauged, is provided. This secures a much more accurate coating of oil on the eggs than the endeavor to regulate the speed of the machine when the time of immersion is measured in seconds. Another factor of my method in having the oil in the whole of the tank at the proper temperature eliminates the difficulty of having the hot oil first absorbed and then the cooler oil sticking thereto forming too thick a coating. Moreover, my procedure allows the oil to drip more freely from the treated eggs.

While I have herein described one form of my invention, modifications thereof may be devised without departing from the spirit thereof, and it is to be understood that such modifications come within the scope of this invention.

What is claimed is:

1. In a processing machine, a treating tank, an upper conveyor, means for placing containers on the upper conveyor, a lower conveyor, means for taking the containers from the upper conveyor, passing them through the treating tank, and depositing them on the lower conveyor.

2. In a processing machine, a treating tank, an upper conveyor, means for placing containers on the upper conveyor, a lower conveyor, means for taking the containers from the upper conveyor, passing them through the treating tank and depositing them on the lower conveyor, and means for moving the containers along the lower conveyor.

3. In a processing machine, a treating tank, an upper conveyor, means for placing containers on the upper conveyor, a lower conveyor, means for taking the containers from the upper conveyor, passing them through the treating tank and depositing them on the lower conveyor, and means for moving the containers along the lower conveyor, the last mentioned means being connected with the means for placing the containers on the upper conveyor.

4. In a processing machine, a treating tank, an upper conveyor, means for placing containers on the upper conveyor, a lower conveyor, means for taking the containers from the upper conveyor, passing them through the treating tank and depositing them on the lower conveyor, the last mentioned means comprising a pair of spaced rotatable arms.

5. In a processing machine, a treating tank, an upper conveyor, means for placing containers on the upper conveyor, a lower conveyor, means for taking the containers from the upper conveyor, passing them through the treating tank and depositing them on the lower conveyor, the last mentioned means comprising a pair of spaced rotatable arms, and means for moving the containers along the lower conveyor.

6. In combination with a processing machine, an egg case adapted to receive filled containers from said machine, and a false bottom adjustable in height in the egg case.

7. In combination with a processing machine, an egg case adapted to receive filled containers from said machine, and a false bottom adjustable in height in the egg case in steps corresponding to the height of each of said filled containers.

8. In combination with a processing machine, an egg case adapted to receive filled containers from said machine, and a false bottom adjustable in height in the case, and adapted to be withdrawn therefrom when the first mentioned container is filled.

9. In a processing machine, a treating tank, an upper conveyor, a separate lower conveyor, means for taking containers from the lower conveyor and depositing them on the upper conveyor and means for taking said containers from the upper conveyor, passing them through the treating tank and depositing them on the lower conveyor.

10. In a processing machine, a treating tank, an upper conveyor, a lower conveyor, means for taking containers from the lower conveyor and depositing them on the upper conveyor and means for taking said containers from the upper conveyor, passing them through the treating tank and depositing them on the lower conveyor, the last mentioned means comprising a rotatable spider wheel.

11. In a processing machine, a treating tank, an upper conveyor, a lower conveyor, means for taking containers from the lower conveyor and depositing them on the upper conveyor, means for taking said containers from the upper conveyor, passing them through the treating tank and depositing them on the lower conveyor, and means for moving the containers on the conveyor.

12. In a processing machine, a treating tank, an upper conveyor, a lower conveyor, means for taking containers from the lower conveyor and depositing them on the upper conveyor and means for taking said containers from the upper conveyor, passing them through the treating tank and depositing them on the lower conveyor, the last mentioned means comprising a rotatable spider wheel, and means for keeping the containers in engagement with said spider during passage through said tank.

13. In an egg processing machine, a rectangular egg tray containing an egg basket having cross and longitudinal partitions forming a plurality of cells, a grid having a pair of side wires supported by opposite sides of the tray and a plurality of cross wires normally positioned below the cells forming a support for the eggs and means to slide the grid likewise, bringing the cross wires into substantial alinement with the cross partitions, allowing the eggs to drop through.

In testimony whereof I have signed my name to this specification.

JOSEPH L. COYLE.